United States Patent
Laursen

(10) Patent No.: US 9,068,558 B2
(45) Date of Patent: Jun. 30, 2015

(54) BOLTED CONNECTION FOR CONNECTING TWO WIND TURBINE COMPONENTS BY BOLTS

(75) Inventor: Christian Laursen, Hedensted (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 548 days.

(21) Appl. No.: 13/332,407

(22) Filed: Dec. 21, 2011

(65) Prior Publication Data

US 2012/0171038 A1    Jul. 5, 2012

(30) Foreign Application Priority Data

Jan. 4, 2011 (EP) .................................. 11150101

(51) Int. Cl.
*F01D 5/30* (2006.01)
*F03D 1/06* (2006.01)
*F16B 33/02* (2006.01)
*F16B 35/04* (2006.01)

(52) U.S. Cl.
CPC ......... *F03D 1/0658* (2013.01); *F05B 2250/292* (2013.01); *F05B 2260/301* (2013.01); *F16B 33/02* (2013.01); *F16B 35/041* (2013.01); *Y02E 10/721* (2013.01)

(58) Field of Classification Search
USPC ........................................................ 411/426
See application file for complete search history.

(56) References Cited

U.S. PATENT DOCUMENTS

| 4,189,975 | A | | 2/1980 | Nisida et al. |
| 5,000,638 | A | | 3/1991 | Essom et al. |
| 5,131,204 | A | * | 7/1992 | Hiendl ............................. 52/848 |
| 6,112,396 | A | * | 9/2000 | Steinbock ........................ 29/452 |
| 7,694,835 | B1 | * | 4/2010 | Montgomery ................. 215/329 |
| 2008/0206015 | A1 | * | 8/2008 | Ambros ........................ 411/415 |
| 2009/0175724 | A1 | | 7/2009 | Russ et al. |

FOREIGN PATENT DOCUMENTS

| CN | 1752467 A | 3/2006 |
| CN | 101576113 A | 4/2009 |
| EP | 1607172 A2 | 12/2005 |
| JP | 2009174564 A | 8/2009 |

OTHER PUBLICATIONS

Patterson et al., "The Optimisation of the design of nuts with partly tapered threads", The Journal of Strain Analysis for Engineering design, vol. 21, No. 2, pp. 77-84, XP02637993; Others; 1986.
Stoeckly et al., "Effect of Taper on Screw-Thread", Transactions of the ASME, vol. 74, pp. 103-112, XP008136952; Others; 1954.

* cited by examiner

*Primary Examiner* — Dwayne J White
*Assistant Examiner* — Justin Seabe

(57) ABSTRACT

A bolted connection for connecting two wind turbine components by bolts is proposed. Each of the bolts has a shaft and a plurality of threads. A transition region between the bolt shaft and the bolt threads is tapered. The bolted connection can be used to connect a rotor blade to a blade bearing of a wind turbine.

6 Claims, 2 Drawing Sheets

BOLTED CONNECTION FOR CONNECTING TWO WIND TURBINE COMPONENTS BY BOLTS

CROSS REFERENCE TO RELATED APPLICATIONS

This application claims priority of European Patent Office application No. 11150101.1 EP filed Jan. 4, 2011, which is incorporated by reference herein in its entirety.

FIELD OF INVENTION

The present invention relates to a bolted connection for connecting two wind turbine components by bolts.

BACKGROUND OF INVENTION

Wind turbines are provided with a rotor shaft which is part of an electrical generator producing electricity during movement of the rotor relative to a stator of the generator. The stator comprises a number of coils, the rotor comprises a number of permanent magnets so that an electric voltage is induced when the rotor is turned.

Wind turbines must be aligned optimally to the wind in order to prevent extreme loads and to provide the highest possible energy output. In order to control the power output of the wind turbine, the blade angle is always optimally adjusted to the wind speed via the blade bearing. High loads must be transferred securely via the bolted connection into the rotor hub.

Conventionally fasteners in the form of bolts, nuts and washers are used to join two or more structural components, e.g. for connecting a rotor blade to a blade bearing. As wind turbines experience a dynamic loading conventional bolted connections suffer from fatigue damage and ultimately fatigue failure can occur. In the past a number of fatal collapses have occurred, therefore the correct dimensioning of bolted connections, in particular for connecting the rotor blade to the blade bearing, is of prime importance.

The most common solution for the problem of fatigue failure is simply to add more and larger bolts. However, this is of course not an economically sensible solution. Therefore in wind turbines with large rotor diameters the bolted connection between rotor blade and blade bearing has become the dimensioning factor for the blade root design, since no more bolts can be added.

SUMMARY OF INVENTION

It is therefore an object of the present invention to provide a bolted connection for a wind turbine with an improved fatigue performance.

According to the present invention this object is achieved in the above defined bolted connection in that a transition region between bolt shaft and bolt thread is tapered.

The present invention is based on the idea that fatigue failure in a bolt always occurs on the first loaded thread where it engages a nut or a blindhole. This is partly due to a notch, caused by the thread profile itself. It is also due to the fact that the first loaded thread of a standard bolt bears about 35% of the load. This causes a high stress concentration factor, which may lead to fatigue failure. Therefore according to the invention bolts with a partly tapered thread are used which exhibit an improved fatigue behaviour in comparison to standard bolts with a constant thread diameter. According to the invention only the transition region of a bolt between bolt shaft and bolt thread is tapered, whereas the remaining thread part has a conventional, constant diameter.

According to the invention it can be envisaged that the angle of taper is between 1° and 7°, preferably between 1° and 3°. The angle of taper is quite small, therefore the end section of a bolt has a slightly conical shape which minimizes the stress concentration factor. It is advantageous that a conventional nut or a conventional blindhole can be used in which the inventive bolt is inserted.

According to the invention the tapered transition region may have a predetermined length, whereby preferably the first two to four threads are tapered. Therefore the tapered transition region is limited to the end section of the bolt, the remaining threads are unchanged with a constant diameter.

In the inventive bolted connection it is in particular preferred that the bolt is inserted through a via hole of the rotor blade and the blade bearing.

An optimum fatigue behaviour can be achieved when the bolt of the inventive bolted connection is inserted into a female non-tapered thread. Preferably the bolt is connected with a nut and an intermediate washer.

Further the invention relates to a wind turbine, comprising a tower, a nacelle accommodating a generator, a rotatable hub, connected to the generator and rotor blades, supported by a blade bearing of the hub.

The inventive wind turbine is characterised in that it comprises at least one bolted connection as explained above.

BRIEF DESCRIPTION OF THE DRAWINGS

The invention and its underlying principle will be better understood when consideration is given to the following detailed description of a preferred embodiment.

In the accompanying drawings.

DETAILED DESCRIPTION OF INVENTION

Figure 1:
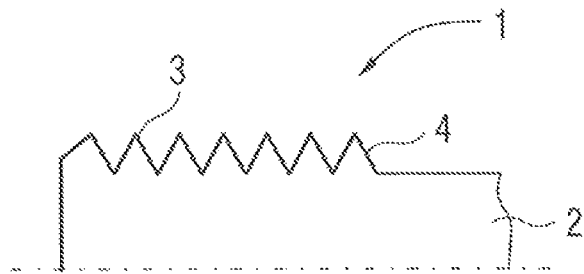
FIG. 1 is a schematic drawing of a conventional bolt.

In FIG. 1 a conventional bolt 1 is shown, whereby only the upper half of the schematic bolt 1 is depicted. The bolt 1 comprises a shaft 2 and a thread 3. The thread 3 is a conventional thread, e.g. a metric thread with a constant diameter.

Figure 2:
FIG. 2 shows the respective load share.

When the bolt 1 is loaded a load share as shown in FIG. 2 will occur. It can be seen that the first loaded thread 4 bears the highest load compared with the neighbouring threads. Therefore a high stress concentration factor is present, which may lead to fatigue failure during lifetime of a bolted connection for which the bolt 1 is used.

Figure 3:
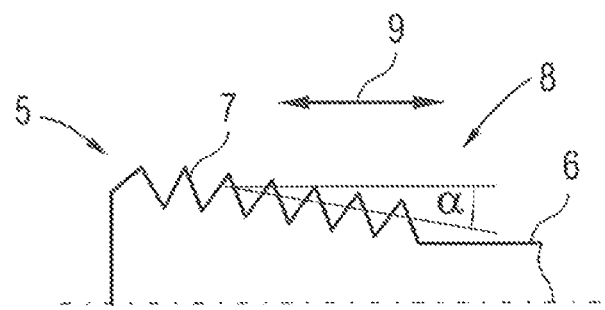
FIG. 3 is a schematic drawing of a bolt according to the invention.

FIG. 3 is a schematic drawing of a bolt according to the invention. A bolt 5 comprises a shaft 6 and a thread 7, in contrast to the first embodiment as shown in FIG. 1 the thread 7 of bolt 5 comprises a tapered transition region 8. The extension of the transition region 8 is indicated by the arrow 9. In this embodiment the transition region 8 comprises four threads which a tapered. Typically the angle of taper is between 1° and 7°, preferably the angle is between 1° and 3°. In FIG. 3 this angle is drawn in an exaggerated scale. Accordingly the tapered transition region can be characterized by the length of the arrow 9 and an angle of taper $\alpha$. In the transition region 8 the thread 7 has a non-constant, conical shape, which leads to a more even load share.

Figure 4:
FIG. 4 shows the respective load share.

As can be seen in FIG. 4 the load share of the different threads is almost even compared to the load share of a conventional bolt, as shown in FIG. 2. In previous research projects it has been found out that the stress concentration factor can be lowered by up to approximately 40% when a bolt with a tapered thread is used. Accordingly with the bolt 5 as shown in FIG. 3 a bolted connection with an improved fatigue performance can be expected.

Figure 5:
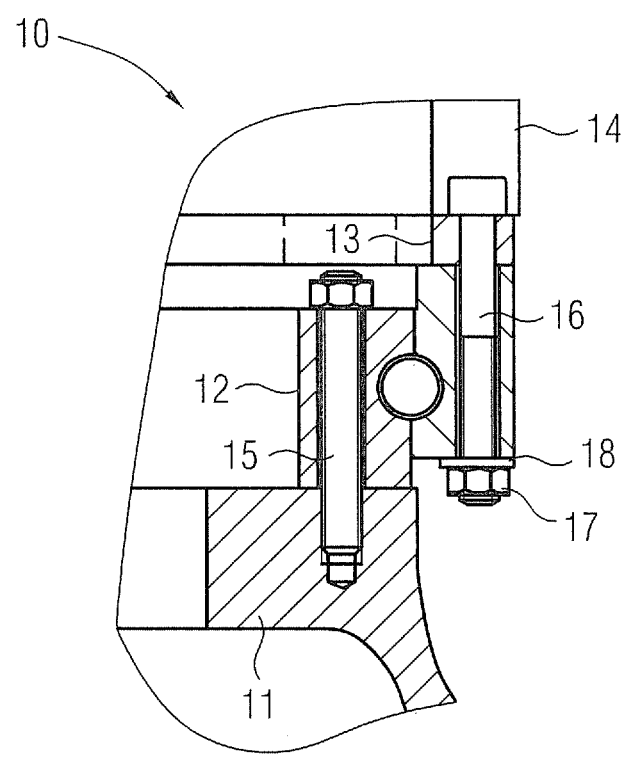
FIG. 5 is a schematic drawing of a bolted connection according to the invention.

FIG. 5 is a sectional view of a bolted connection of a wind turbine. The bolted connection 10 comprises a hub 11, a blade bearing 12 in the form of a roller bearing and a flange 13 of a rotor blade 14. The blade bearing 12, which is also called pitch bearing is used to adjust the angle of the rotor blade 14. Therefore a driving means (not shown) is used in order to move the rotor blade 14. The blade bearing 12 is connected to the hub 11 by a number of bolts 15, which are arranged in circumferential direction. The connection between blade bearing 12 and the flange 13 of the rotor blade 14 is realized by bolts 16, which are inserted through via holes of flange 13 and via holes of the blade bearing 12. A nut 17 and a washer 18 is used to connect flange 13 and blade bearing 12 through the bolt 16. The bolt 16 comprises a tapered transition region between bolt shaft and bolt thread as is shown in FIG. 3, bolt 16 is identical to bolt 5. The bolted connection 10 is able to withstand high fatigue loads because areas of high stress concentration are avoided.

The invention claimed is:

1. A wind turbine, comprising:
   a wind turbine generator;
   a rotatable hub connected to the wind turbine generator, the rotatable hub comprising a blade bearing;
   a rotor blade supported by the blade bearing; and
   at least one bolted connection arranged to connect the rotor blade to the blade bearing, said at least one bolted connection comprising a plurality of bolts arranged in a circumferential direction, each bolt comprising a bolt shaft and a plurality of bolt threads, each bolt thread arranged to carry a load to connect the rotor blade to the blade bearing,
   wherein the bolt threads comprise a transition region between the bolt shaft and the bolt threads, wherein the transition region is tapered in a direction divergent from the bolt shaft as one travels along the bolt shaft in a direction from a head of the bolt towards an end of the bolt opposite the head of the bolt,
   wherein the length of the tapered transition region starts from the first one of the threads closest to the head of the bolt up to the fourth one of the threads, wherein each bolt thread from the first one of the threads to the fourth one of the threads is arranged to carry a load to connect the rotor blade to the blade bearing, wherein the first one of the threads comprises a smaller diameter relative to the fourth one of the threads, wherein a remaining threaded region extending beyond the tapered transition region has a constant diameter.

2. The wind turbine according to claim 1, wherein an angle of the tapered transition region comprises an angle in a range from 1° to 7°.

3. The wind turbine according to claim 2, wherein the range of the angle is from 1° to 3°.

4. The wind turbine according to claim 1, wherein the length of the tapered transition region starts from the second one of the threads closest to the head of the bolt up to the fourth one of the threads.

5. The wind turbine according to claim 1, further comprising respective female non-tapered threads to receive each bolt.

6. The wind turbine according to claim 1, wherein each bolt is inserted through respective holes in the rotor blade and the blade bearing.

* * * * *